United States Patent
Namboodiri et al.

(10) Patent No.: US 9,544,514 B2
(45) Date of Patent: Jan. 10, 2017

(54) AUTOMATIC ADJUSTMENT OF LIGHT FIELD IMAGING SYSTEMS FOR RESOLUTION ENHANCEMENT

(71) Applicants: Vipin Namboodiri, Bangalore (IN); Krishna Prasad Agara Venkatesha Rao, Bangalore (IN); Go Maruyama, Kawasaki (JP)

(72) Inventors: Vipin Namboodiri, Bangalore (IN); Krishna Prasad Agara Venkatesha Rao, Bangalore (IN); Go Maruyama, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/640,309

(22) Filed: Mar. 6, 2015

(65) Prior Publication Data

US 2016/0261809 A1  Sep. 8, 2016

(51) Int. Cl.
*H04N 5/349* (2011.01)
*H04N 5/225* (2006.01)

(52) U.S. Cl.
CPC ............ *H04N 5/349* (2013.01); *H04N 5/2254* (2013.01)

(58) Field of Classification Search
CPC ............ H04N 5/23232; H04N 5/23222; H04N 5/23212; H04N 5/265; H04N 5/2624; H04N 9/097; H04N 5/2254; H04N 5/349; G06T 2207/10052
USPC ................................................ 348/218.1, 343
See application file for complete search history.

(56) References Cited

U.S. PATENT DOCUMENTS

| | | | |
|---|---|---|---|
| 8,315,476 B1 | 11/2012 | Georgiev et al. | |
| 2010/0141802 A1 | 6/2010 | Knight et al. | |
| 2013/0076931 A1* | 3/2013 | Border | G02B 27/0075 348/222.1 |
| 2013/0127901 A1 | 5/2013 | Georgiev et al. | |
| 2013/0216123 A1 | 8/2013 | Shroff et al. | |
| 2013/0216125 A1 | 8/2013 | Shroff et al. | |
| 2014/0198230 A1* | 7/2014 | Tsutsumi | H04N 5/23293 348/218.1 |

OTHER PUBLICATIONS

European Extended Search Report, European Application No. 16156975.1, Aug. 5, 2016, 8 pages.

* cited by examiner

*Primary Examiner* — Nhan T Tran
*Assistant Examiner* — Chan Nguyen
(74) *Attorney, Agent, or Firm* — Fenwick & West LLP

(57) ABSTRACT

A light field imaging system captures different images provide views that are shifted by sub-pixel amounts relative to one another. These views can be combined to produce a higher resolution digital image of the object.

19 Claims, 11 Drawing Sheets

| AA | AB | AC | AD | AE | AF | AG | AH | AI | AJ | AK | AL | AM | AN | AO | AP |
|----|----|----|----|----|----|----|----|----|----|----|----|----|----|----|----|
| BA |    |    |    |    |    |    |    |    |    |    |    |    |    |    |    |

⋮

| PA |  |  |  |  |  |  |  |  |  |  |  |  |  |  | PP |

FIG. 6A

| AA | AB | AC | AD | AE | AF | AG | AH | AI | AJ | AK | AL | AM | AN | AO | AP |
|----|----|----|----|----|----|----|----|----|----|----|----|----|----|----|----|

| AA | AB | AC | AD | AE | AF | AG | AH | AI | AJ | AK | AL | AM | AN | AO | AP |
|----|----|----|----|----|----|----|----|----|----|----|----|----|----|----|----|
| BA | BB | BC | BD | BE | BF | BG | BH | BI | BJ | BK | BL | BM | BN | BO | BP |

AUTOMATIC ADJUSTMENT OF LIGHT FIELD IMAGING SYSTEMS FOR RESOLUTION ENHANCEMENT

BACKGROUND

1. Field of the Disclosure

This disclosure relates generally to light field imaging systems.

2. Description of the Related Art

A light field camera can simultaneously collect multiples images of an object. However, the resolution of a light field imaging system is reduced due to the fact that the resolution of the captured images is typically determined by the number of lenslets in the microlens array, rather than by the number of sensors in the sensor array. Thus, there is a need for approaches to increase the resolution of images captured by a light field imaging system.

SUMMARY

The present disclosure overcomes the limitations of the prior art by providing a method to find a distance of the object from a Plenoptic camera using disparity and other optical parameters, and to find the disparity using distance and other optical parameters.

In one aspect, a light field imaging system includes a primary optical subsystem, a light field sensor module and a processing module. The primary optical subsystem forms an optical image of an object, at an image plane of the primary optical subsystem. The light field sensor module includes a secondary imaging array and a sensor array. The secondary imaging array images a pupil of the primary optical subsystem onto the sensor array, so that the sensor array captures an array of views of the object. The secondary imaging array is not located at the image plane. Rather, it is displaced from the image plane (for example, defocused), so that the captured views exhibit sub-pixel disparity. One or more optical parameters that affect the sub-pixel disparity are adjustable to achieve different resolution enhancement values. The processing module determines a resolution enhancement value using the one or more optical parameters and the first array of views with sub-pixel disparity.

Other aspects include devices, methods, computer readable mediums, systems, components, applications, improvements and other technology related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

FIGS. 6A-6E are diagrams illustrating different approaches to using disparity for resolution enhancement, according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
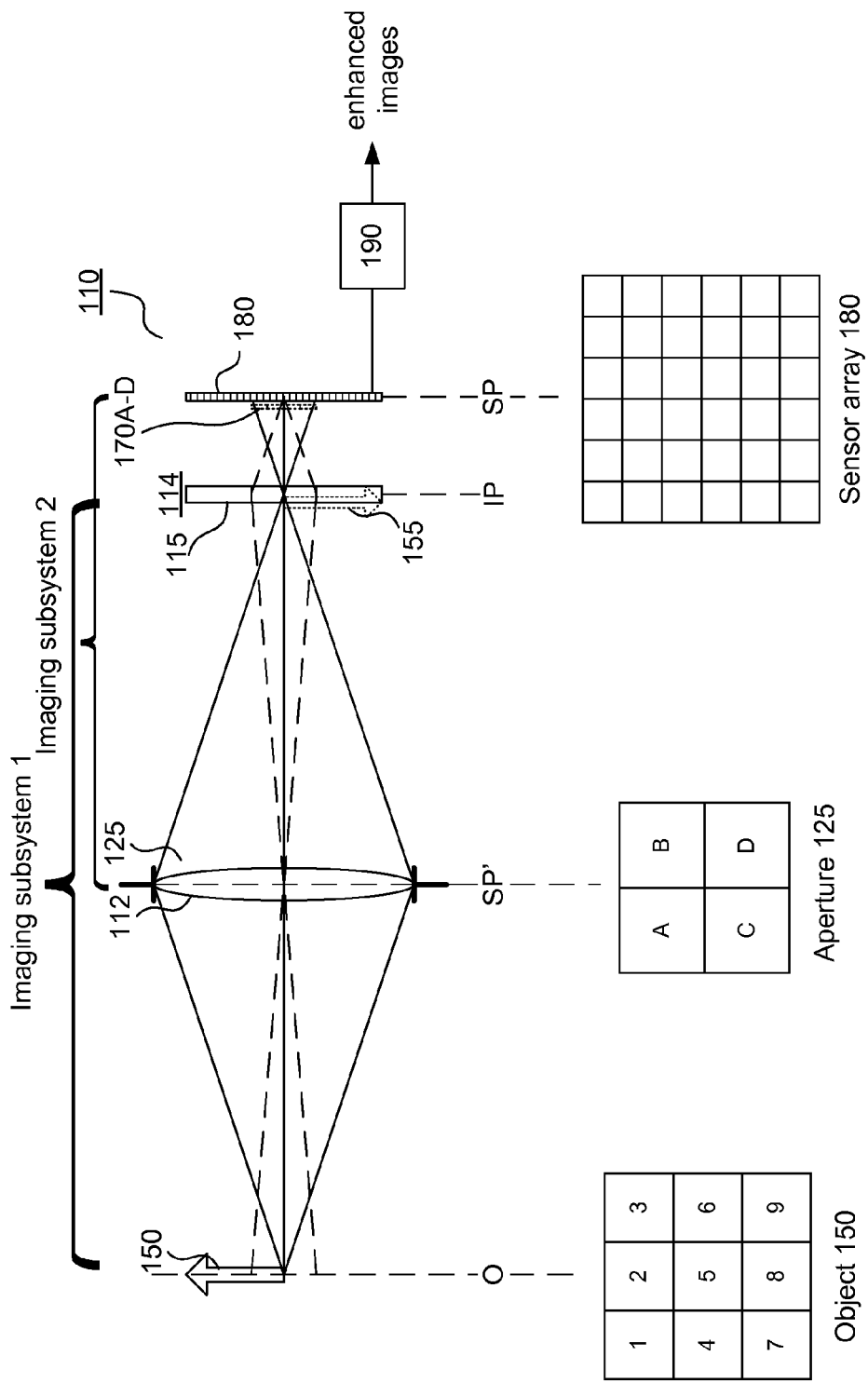
FIGS. 1A-1B are diagrams illustrating a light field imaging system, according to an embodiment.
Figure 1B:
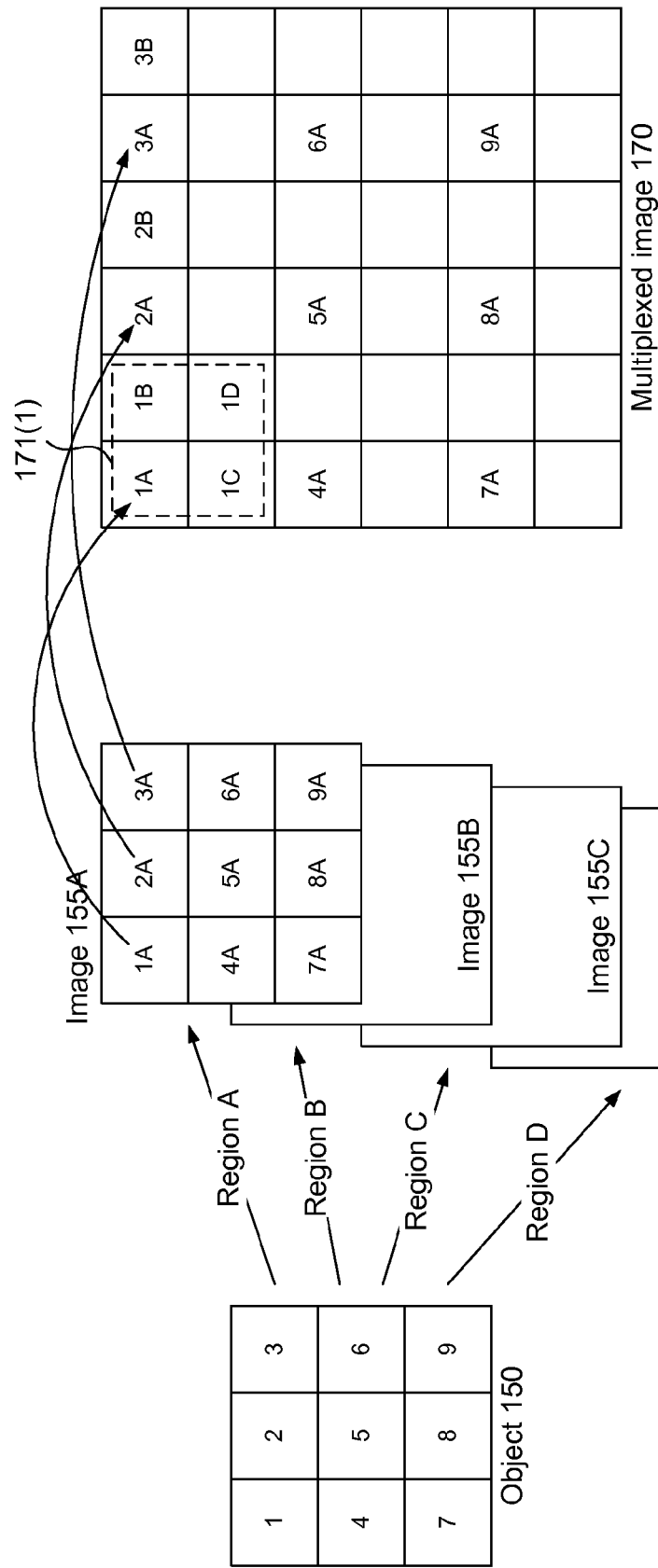

FIGS. 1A-1B are diagrams illustrating an example of a light field imaging system 110. The light field imaging system 110 includes primary imaging optics 112 (represented by a single lens in FIG. 1A), a secondary imaging array 114 (an array of microlenses 115) and a sensor array 180. The secondary imaging array 114 may be referred to as a microimaging array. The secondary imaging array 114 and sensor array 180 together may be referred to as a light field sensor module. These components form two overlapping imaging subsystems, shown as subsystem 1 and subsystem 2 in FIG. 1A.

For convenience, the imaging optics 112 is depicted in FIG. 1A as a single objective lens, but it should be understood that it could contain multiple elements. In FIG. 1A, the objective lens 112 forms an optical image 155 of the object 150 at an image plane IP. When operated at the "in focus" condition, the microimaging array 114 is located at the image plane IP. The system in its entirety forms spatially multiplexed and interleaved optical images 170 at the sensor plane SP. Examples of microimaging arrays 114 include microlens arrays, arrays of pinholes, micromirror arrays, checkerboard grids and waveguide/channel arrays. The microimaging array 114 can be a rectangular array, hexagonal array or other types of arrays. The sensor array 180 is also shown in FIG. 1A.

For purposes of illustration, assume that the microimaging array 114 in FIG. 1A is a 3×3 array of microlenses on a square grid. The object 150 is divided into a 3×3 array of regions, which are labeled 1-9 as shown in the lower portion of FIG. 1A. These regions correspond to the microlenses.

That is, object region 1 is imaged by objective lens 112 onto one of the microlenses, object region 2 is imaged onto another microlens, etc. The sensor array 180 is shown as a 6×6 rectangular array of sensors. That is, there is a 2×2 arrangement of sensors under each microlens. The aperture 125 is divided into a 2×2 rectangular array of regions A-D. These regions correspond to the 2×2 sensor arrangements. That is, aperture region A is imaged by each microlens onto the corresponding sensor of the 2×2 sensors for that microlens, as are aperture regions B, C, D. In some systems, the aperture regions A-D may be filtered by a different spectral filter, for example.

A processing module 190 collects the data from the detector array 180 and processes it accordingly. As a simple example, the processing module 190 may reorder the data, collecting together the data from in order to form an image of the entire object 150 for light passing through the aperture 125. Other types of processing can also be performed, since the captured lightfield includes information with respect to both the pupil plane and the object 150. The processing module 190 is further discussed below with regard to, for example, FIGS. 4, 5, 8, and 9.

FIG. 1B illustrates conceptually how the spatially multiplexed optical images 170A-D are produced and interleaved at sensor array 180. The object 150 produces rays. The rays that propagate through aperture region A would produce an optical image 155A at the IP. To identify the optical image 155A, the 3×3 object regions are labeled with the suffix A: 1A-9A. Similarly, the rays from the object 150 that propagate through aperture regions B, C, D, would produce corresponding optical images 155B, C, D with 3×3 object regions labeled 1B-9B, 1C-9C and 1D-9D. Each of these four optical images 155A-D is produced by rays travelling through different aperture regions A-D but they are all produced simultaneously by the light field imaging system 110 and they are overlapping at the IP.

The four optical images 155A-D, which are overlapping at the IP, are separated by the microimaging array 114. The images 155A-D are interleaved at the sensor plane, as shown in FIG. 1B. Using image 155A as an example, the 3×3 object regions 1A-9A from optical image 155A are not contiguous in a 3×3 block within optical image 170. Rather, regions 1A, 1B, 1C and 1D, from the four different optical images, are arranged in a 2×2 fashion in the upper left of optical image 170 (the inversion of image 170 is neglected for clarity). Object regions 2-9 are similarly arranged. Thus, the regions 1A-9A that make up optical image 170A are spread out across the composite optical image 170, separated by portions of the other optical images 170B-D. Put in another way, if the sensor is a rectangular array of individual sensor elements, the overall array can be divided into rectangular subarrays 171(1)-(9) of sensor elements (the dashed outline shows one subarray 171(1)). For each object region 1-9, all of the corresponding regions from each image are imaged onto the subarray. For example, object regions 1A, 1B, 1C and 1D are all imaged onto subarray 171(1). Note that since the aperture 125 and sensor array 180 are located in conjugate planes, each microlens 115 in array 114 forms an image of the pupil plane (same plane as SF) at the sensor plane SP. Since there are multiple microlenses 115, multiple images 171 are formed.

Further note that, in the system shown in FIGS. 1A-1B, the optical images 155A-D are registered with each other. That is, optical image 155A captures the same object region as optical images 155B, C, D. This is because the object is "in focus," meaning that the image plane for the object is coincident with the location of the microimaging array 114.

Figure 2A:
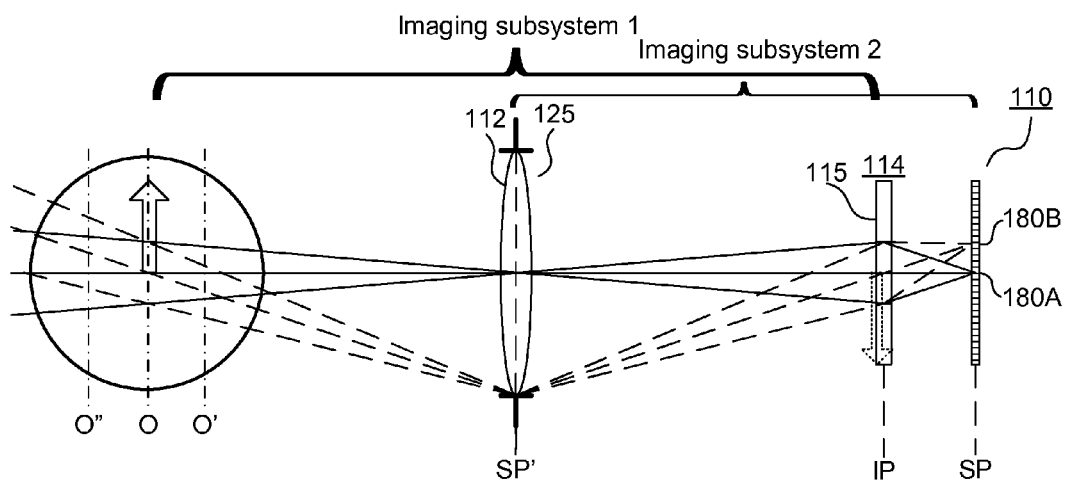
FIG. 2A is a diagram illustrating disparity in a light field imaging system, according to an embodiment.
Figure 2B:
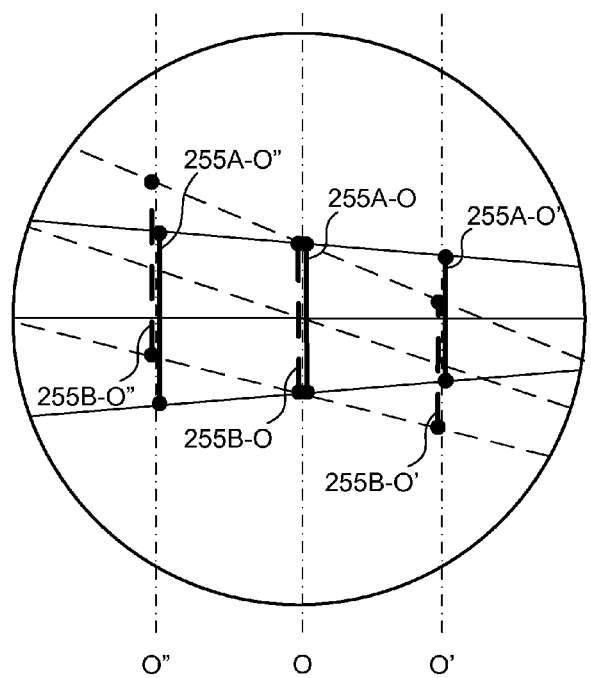
FIG. 2B is a magnification of the object area of FIG. 2A, according to an embodiment.

Now consider what happens when the object is "out of focus," as illustrated in FIGS. 2A-2B.

In FIG. 2A, consider two points in the sensor plane: 180A and 180B. Point 180A is on-axis located under the middle microlens, and point 180B is shifted away from the center point 180A but still under the same middle microlens. First trace rays backwards from point 180A. These rays are shown by the solid lines. Also trace rays backwards from point 180B. These rays are shown by the dashed lines. These rays represent the cone of rays that will be collected by the respective sensor point 180. Rays that fall within the solid cone between the microimaging array 114 and the sensor array 180 will be collected by sensor point 180A, and rays that fall within the dashed cone will be collected by sensor point 180B. Where these rays intersect the object represents the object region collected by the respective sensor point 180.

For example, first consider the solid rays for point 180A. FIG. 2B shows a magnified view of the object region of FIG. 2A. If the object is located at plane O (for example, the "in focus" condition), then the sensor point 180A will collect rays from object region 255A-O, as denoted by the heavy solid line in FIG. 2B. If the object is "out of focus," that means the image is no longer formed exactly at plane IP or, equivalently, that the object is no longer located exactly at plane O. Rather, the object may be located before or after plane O, for example at planes O' or O". If the object is located at plane O' (for example, "out of focus"), then the sensor point 180A will collect rays from object region 255A-O'. Similarly, if the object is located at plane O" (for example, also "out of focus"), then the sensor point 180A will collect rays from object region 255A-O".

A similar analysis can be made for sensor point 180B. The dashed rays define the cone of rays collected by sensor point 180B. If the object is located at "in focus" plane O, then the sensor point 180B will collect rays from object region 255B-O, as denoted by the heavy dashed line in FIG. 2B. For an object at plane O' or O", the sensor point 180B will collect rays from object region 255B-O' or 255B-O", respectively. This type of analysis can be repeated for any of the points on the sensor plane under the same microlens, and it can also be repeated for the other microlenses.

Note that when the object is in focus, object regions 255A-O and 255B-O are coincident. That is, each sensor point 180 collects light from the same object region. However, when the object is out of focus, different sensor points collect light from object regions that are shifted relative to each other. At object plane O', sensor 180A collects light from object region 255A-O', sensor 180B collects light from object region 255B-O', and the two object regions 255A-O' and 255B-O' are not coincident. Rather, they are shifted with respect to each other. This shift is also referred to as disparity. Similarly, for object plane O", the two object regions 255A-O" and 255B-O" are also shifted with respect to each other, but the disparity is in the other direction.

If the multiplexed image 170 includes shifted images of the same object, then the multiplexed image 170 can be processed by processing module 190 to reconstruct a higher resolution digital image of the object. The processing could be deinterleaving and demultiplexing. It could also include more sophisticated image processing, including various superresolution techniques.

Figure 3A:
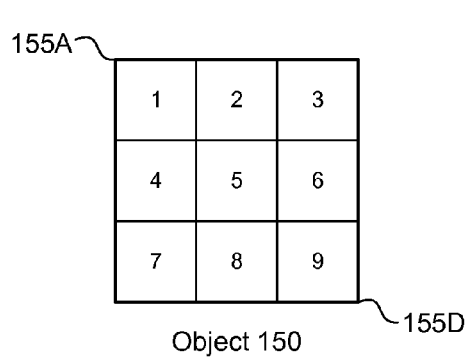
FIGS. 3A-3B are diagrams illustrating disparity in a light field imaging system, according to an embodiment.
Figure 3B:
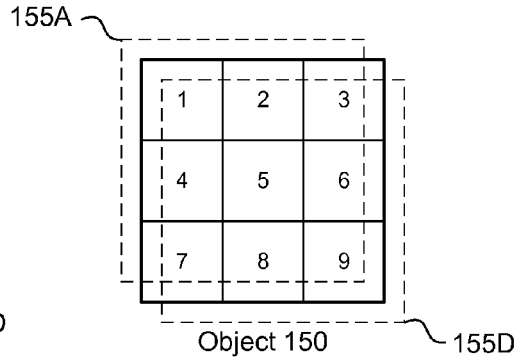

The concept of disparity is shown further in FIGS. 3A-3B. FIG. 3A shows the situation when the object 150 is "in focus." The nine squares labeled 1-9 represent the object of FIG. 1. In FIG. 3A, images 155A and 155D are represented as dashed squares. However, these dashed squares are not visible because they are coincident with the heavy outer border of the object 150.

In FIG. 3B, the object 150 is "out of focus." That is, the object forms an image that is not coincident with the location of the microimaging array 114. One effect of this defocusing is that images 155A and 155D shift with respect to each other. For clarity, images 155B and 155C are not shown. In FIG. 3B, images 155A and 155D are shifted with respect to each other. The four images 155A-D then form a set of images that are shifted a half pixel in each of x and y directions. These four images can then be combined using superresolution techniques to form a higher resolution image.

More generally, different sub-pixel shifts can be used to construct various types of higher resolution images. For example, if the image-to-image shift is ¼ pixel, then a 4× higher resolution image can be constructed. The sub-pixel shift effectively adds higher resolution information to the collected data. This can be used to reconstruct higher resolution images. Note that the "pixel" size is determined by the microlens size, not the sensor pixel size. That is, in the typical light field arrangement, one "pixel" is the size of one microlens (which typically is many sensors).

Figure 4:
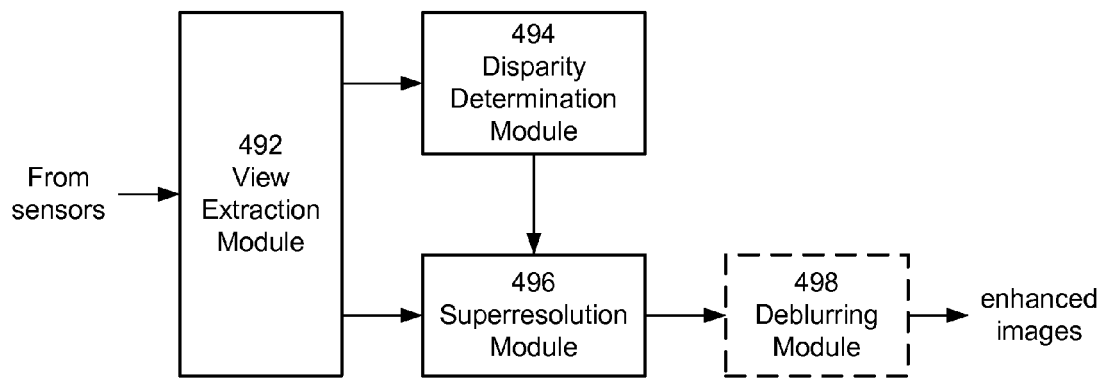
FIG. 4 is a block diagram of a processing module, according to an embodiment.

FIG. 4 is a block diagram of one implementation of processing module 190. In this example, the multiplexed and interleaved images 155 are received by a view extraction module 492, which separates the sensor data into separate images 155 (or views). As described above, these views are shifted relative to each other. That is, they exhibit disparity. Preferably, the disparity from one view to the next is less than one pixel. That is, the view-to-view disparity is sub-pixel. Module 494 determines the disparity. For example, it may do this by comparing different views 155. Alternately, module 494 may obtain the disparity from other sources, for example user input. Module 496 then applies superresolution techniques to combine the multiple views with sub-pixel disparity into an image with higher resolution than the original views. Accordingly, the results of the process are enhanced images. Optional additional processing, such as deblurring 498, may also be applied.

Figure 5:
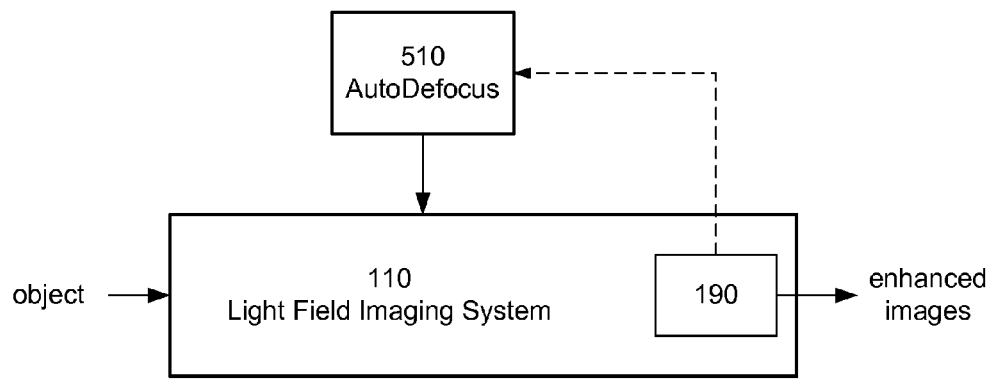
FIG. 5 is a block diagram illustrating active control of a light field imaging system to achieve a desired level of resolution enhancement, according to an embodiment.

FIG. 5 is a block diagram illustrating active control of a light field imaging system 110 to achieve a desired level of resolution enhancement. In FIG. 5, box 110 represents the light field imaging system, for example from FIG. 1A. Only the processing module 190 is explicitly shown. In this example, a certain level of resolution enhancement is desired. For example, maybe the user desires a 4× resolution enhancement. For convenience, this may be referred to as a resolution enhancement value of 4. The Auto Defocus 510 determines the correct amount of defocus to achieve the sub-pixel disparity corresponding to the desired resolution enhancement value. For example, for 4× resolution enhancement, the Auto Defocus 510 may move the objective lens (or otherwise adjust the focus condition) to obtain ¼ pixel disparity. In some embodiments, the Auto Defocus 510 is part of the light field imaging system 110.

Optionally, feedback from the processing module 190 may be used to control the Auto Defocus 510. If the actual disparity determined by the processing module 190 is more or less than ¼ pixel, then the Auto Defocus 510 further drives the light field imaging system until the desired disparity is achieved.

The example of FIG. 1A used a 3×3 array of microlenses with a 2×2 array of sensors under each microlens. This was done for purposes of illustration. Real-world light field imaging systems typically will have many more microimaging elements and sensor elements. For example, a typical design might have a microlens array with 200-300 microlenses per side (for a total of 50,000 to 100,000 microlenses), and a sensor array under each microlens with 10-20 sensors per side (for a total of 100-500 sensors per microlens). Typical sensor dimensions may be approximately 5 microns per side.

For the following examples, assume a 5 μm×5 μm sensor element, 16×16 sensors under each microlens where each microlens is 80 μm×80 μm, and a 200×200 microlens array with total size of 16 mm×16 mm. The pixel size in this example is the microlens size: 80 μm×80 μm, which is the native resolution of this light field system.

Figure 6D:
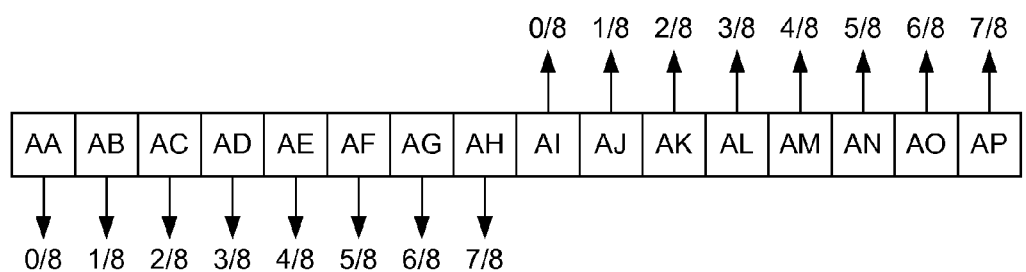

FIGS. 6A-6E are diagrams illustrating different approaches to using disparity for resolution enhancement, according to an embodiment. FIG. 6A is a diagram of a 16×16 sensor region under one microlens. This region contains 16×16=256 sensors, each of which corresponds to a different image or view. In FIG. 1B, these images were denoted by the suffix A-D. FIG. 6A uses two-letter suffixes: AA to PP. If the object is in focus, then there will be no disparity between views. That is, views AA to PP will all be aligned. However, if the primary imaging system is out of focus, then disparity can be introduced.

If the view-to-view disparity is 1/16 pixel (for example, the disparity from view AA to view AB is 1/16 pixel), then the 256 views can be combined to produce a single image with 16× higher resolution. This is illustrated in FIG. 6B, which maps the different views to their corresponding disparity amounts. Image AA is the baseline for measuring disparity, image AB provides the view with 1/16 pixel disparity relative to image AA, image AC provides the view with 2/16 pixel disparity relative to image AA, etc.

For clarity, FIG. 6B shows resolution enhancement only along one direction, although these techniques can be applied to both horizontal and vertical directions. Furthermore, the amount of resolution enhancement and/or the final resolution could be different in the horizontal and vertical directions. For example, in the case of machine vision applications, increase in resolution in one dimension might be more important than in the other dimension. Another situation where non square sampling could be used is in the case of geometric design of multispectral filters where the filter can be rectangular to accommodate higher horizontal or vertical resolutions.

Furthermore, this example addresses resolution enhancement for an object located on a two-dimensional plane. For a three-dimensional object, the disparity varies with depth (as determined by block 494 of FIG. 4), and different regions of the image would have different disparity levels. For example, consider a smooth three-dimensional object. The view-to-view disparity at one depth might be 0.25 pixels. As the object z-location moves closer to the focal point, the disparity might decrease to 0.24 pixels and then to 0.22 pixels, etc. As the object z-location moves away from the focal point, the disparity could increase to 0.27 pixels to even 0.33 pixels. A scene with objects at various depths might have disparity variations of 0.25 and 0.10 pixels in neighboring regions. In these cases, module 494 may determine the depth profile in order to determine the local disparity. Block 494 may optionally also resolve occlusion and reveal.

Alternately, in FIG. 6C, every other view is used to produce an image with 8× higher resolution. The view-to-view disparity across all views is 1/16 pixel. However, views AA, AC, AE, etc. form a group of views that are used to produce an 8× resolution digital image. The view-to-view disparity within this group is ⅛ pixel, as shown in FIG. 6C which uses view AA as the baseline for the group. The group is formed by selecting every Nth view (N=2 here). However, this only uses ¼ of the total sensors. The remaining sensors can be used to produce 3 additional groups, each of which can also produce digital images with 8× resolution. There is one group AB, AD, AF, etc. In FIG. 6C, disparity for that group is shown relative to view AB. Similarly, there are two other groups starting with image BA and BB, respectively. If desired, different filters can be placed in the plane of the aperture 125, so that a total of four images are produced, each with 8× resolution and filtered differently. Four filters might be red, green, blue and clear, for example. FIG. 6C shows the first two rows of 16 sensors split into four 8× resolution images.

Images of different resolution can also be produced. For example, the 16× resolution image of FIG. 6B and the 8× resolution images of FIG. 6C can both be produced. View AA can be included in the group of FIG. 6B to produce the 16× resolution image, and it can also be included in the group of FIG. 6C to produce the 8× resolution image.

A similar result can be achieved by using a view-to-view disparity of ⅛ pixel, as shown in FIG. 6D. In this example, views AA-AH are one group used to produce one 8× resolution image (disparity shown relative to view AA), and views AI-AP are a second group used to produce the other 8× resolution image (disparity shown relative to view AI). A third and fourth group of views would also be available from sensors not shown in FIG. 6D. Again, each image may be filtered differently, although this filtering pattern is easier to produce because the filters are less finely interleaved compared to FIG. 6C. One difference between FIGS. 6C and 6D is that, in FIG. 6D, the views in one group are all contiguous, whereas they are interleaved in FIG. 6C. Another difference is that the total disparity in one dimension across all views is greater than one pixel in FIG. 6D, but less than one pixel in FIG. 6C.

Figure 6E:
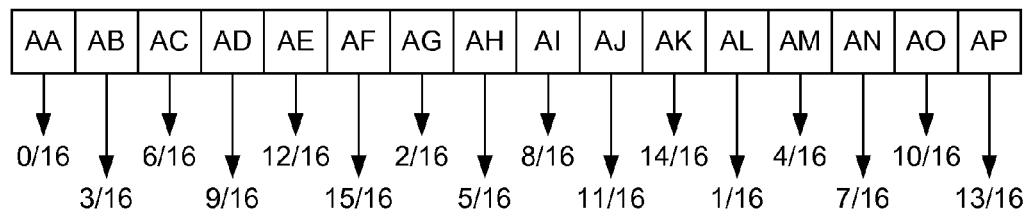

In FIG. 6E, the view-to-view disparity is 3/16 pixel. This can also be used to produce a 16× resolution image, although with some reordering of pixels. These are just some examples. Other combinations will be apparent. In addition, the view-to-view disparity does not have to exactly match the desired degree of superresolution. For example, if the view-to-view disparity was ⅙ pixel, and a 4× resolution enhancement is desired, the views could be interpolated or otherwise combined to yield the 4× enhancement. Similarly, if the microlenses were placed on a hexagonal grid, values on a rectangular grid could be interpolated from the hexagonal grid.

Figure 7A:
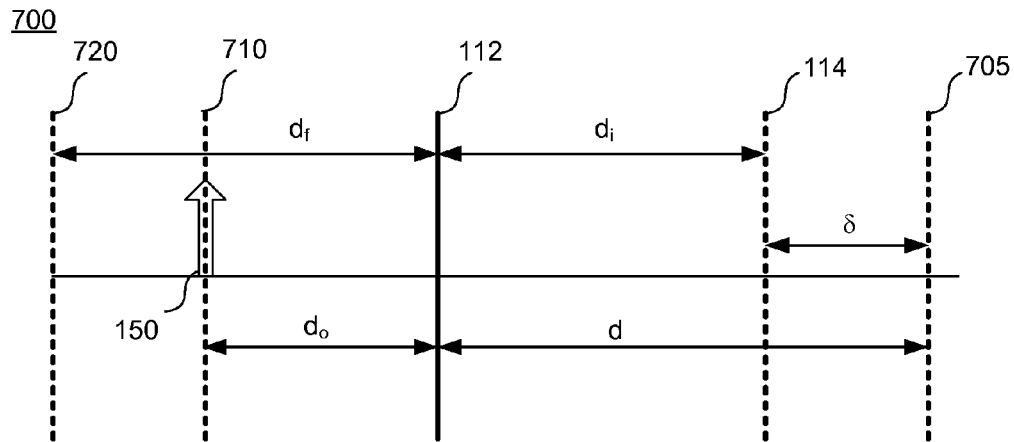
FIG. 7A is a simplified optical diagram of a portion of a light field imaging system that includes primary imaging optics, according to an embodiment.

Turn now to a discussion of an example derivation of a formula the light field imaging system 110 may use in calculating disparity, for example in order to set the correct Auto Defocus 510 in FIG. 5. This example is based on thin lens, paraxial optics, although more complex approaches may also be used. FIG. 7A is a simplified optical diagram 700 of a portion of a light field imaging system 110 that includes the primary imaging optics 112, according to an embodiment. The diagram 700 includes the primary imaging optics 112 and the micro-imaging array 114.

The primary imaging optics 112 is separated from the micro-imaging array 114 by a distance $d_i$, which for convenience will be referred to as the array distance. The object 150 is located in the object plane 710, which is separated from the primary imaging optics 112 by an object distance $d_o$. The primary imaging optics 112 has an effective focal length f. Some of these quantities are adjustable. For example, the effective focal length f may be adjustable if the lens is a zoom lens. Alternately, the array distance $d_i$ may be adjustable by mechanical motion. If f, $d_i$ and $d_o$ are selected to satisfy the lensmaker's equation, also known as the thin lens equation, then the object 150 will be in focus and there will be zero disparity.

However, the goal for Auto Defocus 510 is to defocus the primary imaging optics 112 in order to achieve a controlled amount of disparity. In that case, f, $d_i$ and $d_o$ will not satisfy the thin lens equation. So let $d_f$ be the object distance that satisfies the thin lens equation for $d_i$. The diagram 700 also includes a zero disparity plane 720 that is separated from the primary imaging optics 112 by a zero disparity distance $d_f$.

Additionally, let d be the image distance that satisfies the thin lens equation for $d_o$. The diagram 700 illustrates an image plane 705 when the object 150 is at $d_o$. The image plane 705 is separated from the micro-imaging array 114 by δ. From the diagram 700, $$\delta = d - d_i \quad (1)$$

$$-\delta = d_i - d \quad (2)$$

Indicating a negative disparity when $d_o < d_f$.

In case of $d_o > d_f$, the equation is exactly same except the negative disparity changes to positive disparity with a sign change.

$$\delta = d_i - d \quad (3)$$

Substituting for $d_i$ and d using the thin lens equation, for the case when $d_o > d_f$, δ can be further derived as:

$$\delta = \left(\frac{f * d_o}{d_o - f}\right) - \left(\frac{f * d_f}{d_f - f}\right) \quad (4)$$

$$= \frac{(d_o - d_f) * (d_i - f)}{(d_o - f)} \quad (5)$$

Figure 7B:
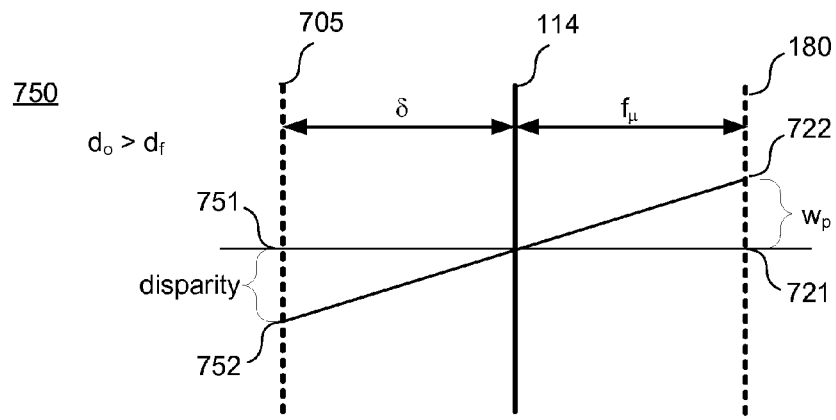
FIG. 7B is a simplified optical diagram of a light field imaging system that includes a micro-imaging array for a case where $d_o > d_f$, according to an embodiment.

FIG. 7B is a simplified optical diagram 750 of the light field imaging system 110 that includes the micro-imaging array 114 for a case where $d_o > d_f$ according to an embodiment. The diagram 750 includes the micro-imaging array 114 and the sensor array 180. The sensor array 180 includes a plurality of sensors that each have a size of $w_p$. For example, referring to the 16×16 sensor array of FIG. 6A, $w_p$ is the size of the sensor pixel size. The sensor array 180 is separated from the micro-imaging array 114 by an effective focal length of the micro-imaging array 114 ($f_\mu$). When $d_o > d_f$, the actual image plane 705 is located in front of the micro-imaging array 114 by the distance δ.

Figure 7C:
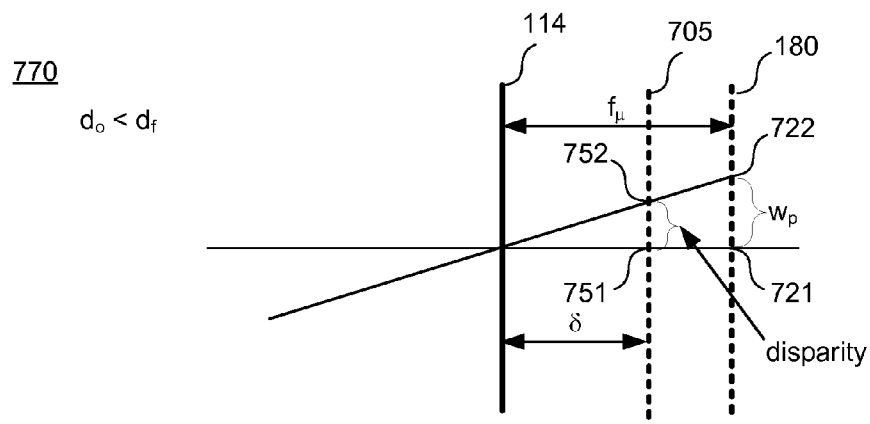
FIG. 7C is a simplified optical diagram of the light field imaging system that includes a micro-imaging array for a case where $d_o < d_f$, according to an embodiment.

Likewise, FIG. 7C is a simplified optical diagram 770 of the light field imaging system 110 that includes the micro-imaging array 114 for a case where $d_o < d_f$ according to an embodiment. In this case, the actual image plane 705 is located behind the micro-imaging array 114 by the distance δ.

Recall that adjacent sensors (for example, sensors AA and AB in FIG. 6A) correspond to adjacent views. As shown in FIGS. 7B and 7C, the sensor centered at point 721 will "see" the portion of the image centered at 751, and the adjacent sensor centered at point 722 will "see" the portion of the image centered at 752. Thus, these adjacent sensors, which represent adjacent views, see portions of the image that are separated by a distance labelled "disparity." This is the view-to-view disparity, which from the figures can be derived as:

$$\text{Disparity} = \alpha * \frac{w_p}{f_\mu} * \delta \qquad (6)$$

where α is a factor that is added to account for image processing. There may be slight differences between the modeled and measured disparity, and cc accounts for these differences. In some embodiments, where there are no differences in the modeled and measured disparity and/or they are very small a may be set to a value of 1. Substituting equation (5) for δ yields $$\text{Disparity}_{in\ units\ of\ distance} = \alpha * \frac{w_p}{f_\mu} * \frac{(d_o - d_f)*(d_i - f)}{(d_o - f)} \qquad (7)$$

Equation (7) expresses the disparity in units of distance at the image plane 705. Let ϕ be the distance between two pixels of a given view. Referring to FIG. 6A, ϕ is the distance from sensor AA under one microlens to the co-located AA under the adjacent microlens. Alternately, ϕ is the length of one microlens. Dividing equation (7) by ϕ yields the disparity expressed in pixels, which is denoted by Δ:

$$\text{Disparity}_{in\ units\ of\ pixels} = \Delta = \alpha * \frac{w_p}{\varphi * f_\mu} * \frac{(d_o - d_f)*(d_i - f)}{(d_o - f)} \qquad (8)$$

Note that in equation (8), $w_p/\phi=1/K$, where K is the number of sensors along one dimension of a microlens. In FIG. 6A, K=16.

Disparity in units of pixels (Δ) represents the disparity between two neighboring views. The neighboring views may be horizontal or vertical. Assuming that the optical axis of the system is along a z coordinate, two views horizontally separated in x coordinate by M views and vertically in the y coordinate by N views, is given by:

$$\Delta_{(x,y)} = (\Delta + M, \Delta + N) \qquad (9)$$

Note that equations (6)-(9) were derived in part using the thin lens equation to simplify the mathematics. In other embodiments, other more accurate models may be used in lieu of the thin lens equation. For example, in some embodiments, the thick lens equation may be used in the derivation of equations (6)-(9).

Figure 8:
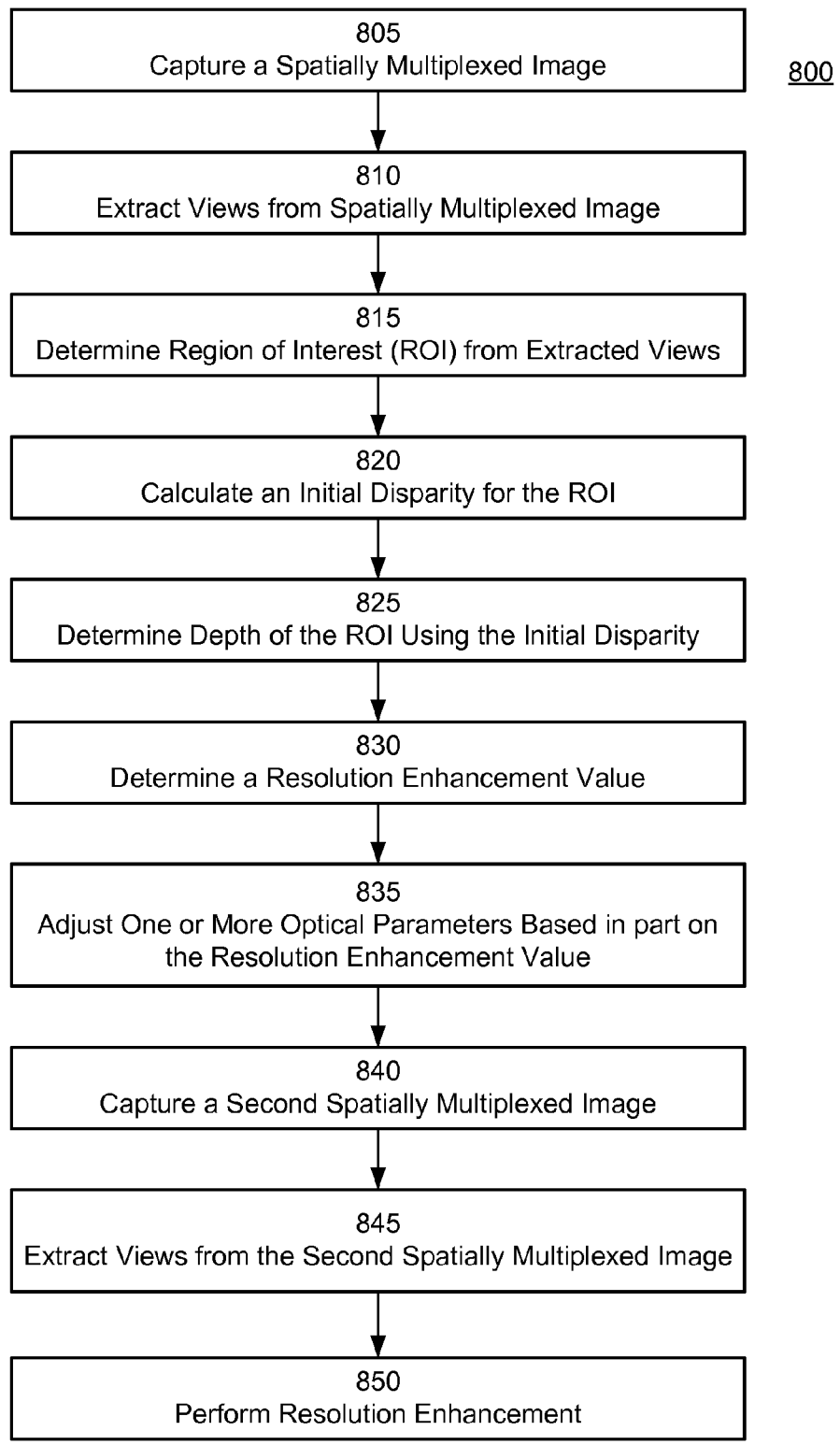
FIG. 8 is a flow diagram of a process for performing superresolution, according to an embodiment.

Turning now to an implementation using the above described equations for disparity, FIG. 8 is a flow diagram of a process 800 for performing superresolution, according to an embodiment. In one embodiment, the process 800 of FIG. 8 is performed by the light field imaging system 110 (for example, via the processing module 190). Other components or modules may perform some or all of the steps of the process in other embodiments. Likewise, embodiments may include different and/or additional steps, or perform the steps in different orders.

The light field imaging system 110 captures 805 a spatially multiplexed image 170. In some embodiments, the light field imaging system 110 uses default values for one or more optical parameters in capturing 805 the spatially multiplexed image 170. Optical parameters are parameters which impact the disparity value. Optical parameters may include, for example, f, $d_o$, $d_f$, d, $d_i$, $f_\mu$, $w_p$, ϕ, δ, and combinations thereof. The values of the optical parameters can be stored as part of a calibration database of optical parameters. The calibration database stores mappings between resolution enhancement values for various combinations of f, $d_i$ and/or $d_o$. As discussed above with reference to FIG. 1A, the imaging subsystem 1 forms an optical image of an object 150, at an image plane of the primary optical subsystem 1, and an imaging subsystem 2 images a pupil of the imaging subsystem 1 onto the sensor array 180, so that the sensor array 180 captures an array of views of the object. The array of views is referred to as the spatially multiplexed image.

The light field imaging system 110 extracts 810 the different views from the spatially multiplexed image. The light field imaging system 110 determines 815 a region of interest (ROI) in the extracted views. In some embodiments, the ROI is selected automatically, for example, the light field imaging system 110 selects a center portion of the extracted views as the ROI. In other embodiments, a user may select a portion of the extracted views as the ROI.

The light field imaging system 110 calculates 820 an initial disparity value $D_{int}$ for the ROI, for example by matching corresponding features in different views. The initial disparity value may be calculated using various methods like, for example, block matching, auto correlation, PPC, light field scale and Depth (Lisad), etc.

The light field imaging system 110 determines 825 a range of depths (for example, range of object distances) of the ROI. It could do this by using the calculated disparity $D_{int}$ (in units of pixels) in equation (8) to solve for the depth $d_o$:

$$d_o = \frac{\left(\left(\frac{w_p}{\varphi * f_\mu}\right) * (d_i - f) * d_f\right) - (f * D_{int})}{\left(\left(\frac{w_p}{\varphi * f_\mu}\right) * (d_i - f)\right) - D_{int}} \qquad (10)$$

The light field imaging system 110 may determine a minimum value for $d_o$, $d_o$(min), and a maximum value for $d_o$, $d_o$(max), using equation (10). The depth range of the ROI ranges from $d_o$(max) to $d_o$(min).

The light field imaging system 110 then determines 830 a desired resolution enhancement value, taking into account the depth range of the ROI. The depth range may limit which resolution enhancement values are achievable. In one approach, the light field imaging system 110 selects a resolution enhancement value for an object distance $d_{o\text{-}adjusted}$ that lies within the range $d_o$(min) to $d_o$(max). It also identifies a corresponding value for the focus setting $f_{adjusted}$, using the calibration database. This value $f_{adjusted}$ is the focus setting that will result in the desired resolution enhancement value for the depth $d_{o\text{-}adjusted}$. In some embodiments, the light field imaging system 110 identifies a $d_{o\text{-}adjusted}$ within the range of $d_o$(min) to $d_o$(max) that is associated with a highest achievable resolution enhancement value. The light field imaging system 110 may also calculate an adjusted disparity value $D_{adjusted}$ that corresponds to the selected resolution enhancement value.

The light field imaging system 110 adjusts 835 one or more optical parameters in order to implement the selections made in step 830. For example, the primary imaging optics 112 may be adjusted to implement the effective focal length $f_{adjusted}$. As another example, the array distance $d_i$ may also be adjusted if necessary. In one approach, the light field imaging system 110 uses the determined values for $d_{o\text{-}adjusted}$, $f_{adjusted}$, and $D_{adjusted}$ to calculate an adjusted $d_{f\text{-}adjusted}$ via:

$$d_{f\text{-}adjusted} = d_{o\text{-}adjusted} - \frac{\left((d_{o\text{-}adjusted} - f_{adjusted}) * D_{adjusted}\right)}{\left(\left(\frac{w_p}{\varphi * f_\mu}\right) * (d_i - f_{adjusted})\right)} \quad (11)$$

This, via the thin lens equation, determines the distance $d_{i\text{-}adjusted}$ between the primary imaging optics 112 and the sensor array 180. The light field imaging system 110 can adjust this spacing as needed.

In some embodiments, the light field imaging system 110 also sets an aperture of the primary imaging optics 112 for maximum sensor utilization (for example, the light field imaging system 110 sets the aperture of the primary imaging optics 112 such that its fstop matches the fstop of the microimaging array 114).

The light field imaging system 110 captures 840 a second spatially multiplexed image based on the adjusted optical parameters. The light imaging system 110 extracts 845 views from the captured image in a similar manner as described above with respect to step 810.

The light field imaging system 110 performs 850 resolution enhancement using the extracted views from the second spatially multiplexed image. In some embodiments, the optical parameters were adjusted to achieve the highest resolution enhancement possible for a given ROI. Accordingly, the extracted views in some embodiments are such that the light field imaging system 110 is able to obtain a maximum resolution enhancement of the extracted views.

Figure 9:
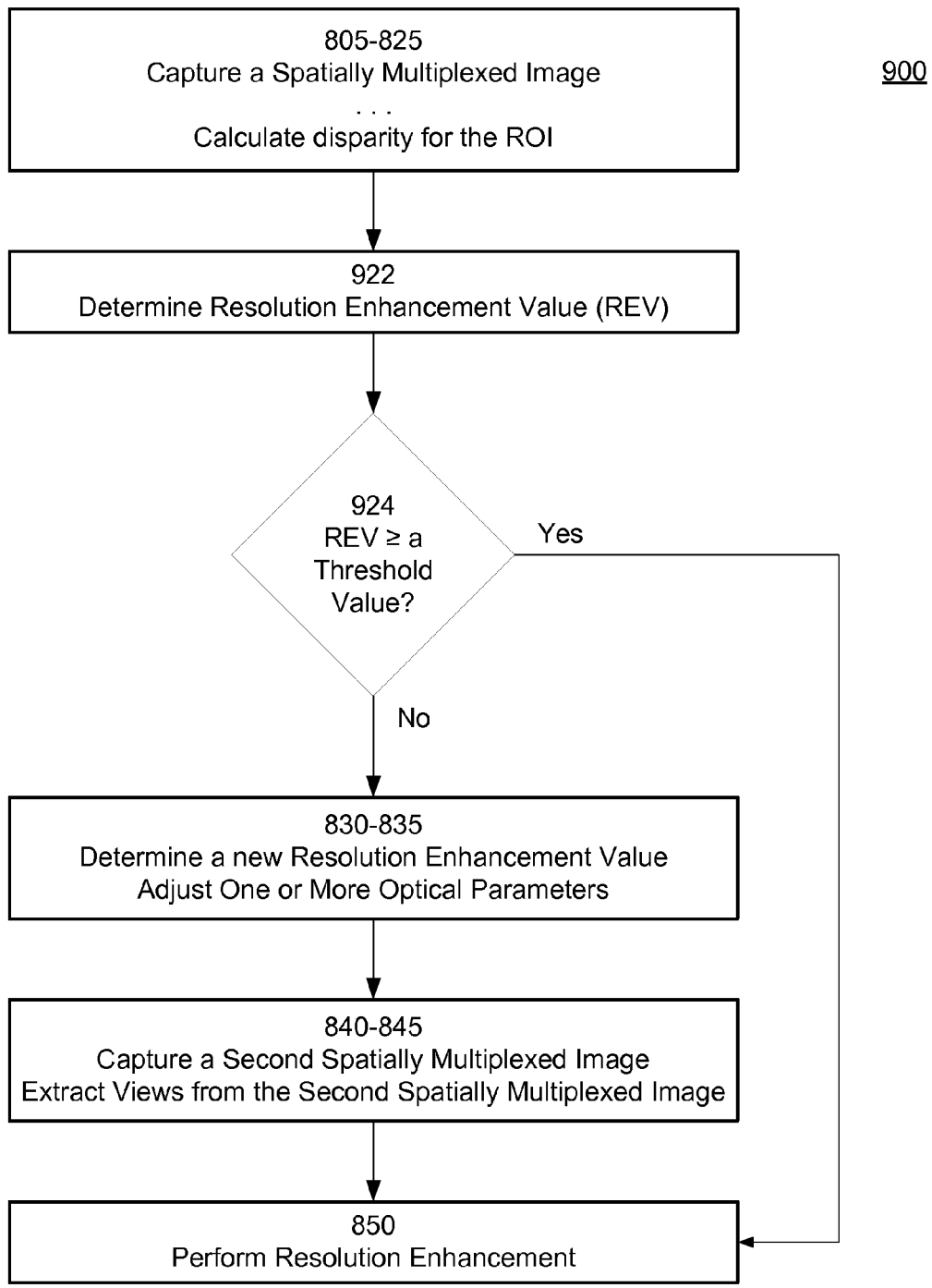
FIG. 9 is a flow diagram of another process for performing superresolution, according to an embodiment.

FIG. 9 is a flow diagram of another process 900 for performing superresolution, according to an embodiment. In one embodiment, the process 900 of FIG. 9 is performed by the light field imaging system 110 (for example, via the processing module 190). Other components or modules may perform some or all of the steps of the process in other embodiments. Likewise, embodiments may include different and/or additional steps, or perform the steps in different orders.

In FIG. 9, some of the boxes are intended to include multiple steps from FIG. 8. For example, the box "805-825" includes the steps 805, 810, 815, 820, and 825 from FIG. 8. In step 820, the disparity for the ROI is calculated, and in step 825 a range of depths (for example, range of object distances) is determined for the ROI. The light imaging system 110 then determines 922 the resolution enhancement value for the captured spatially multiplexed image and decides whether 924 the resolution enhancement value is sufficiently high, for example greater than or equal to a threshold value. In one design, the decision 924 may be whether the current disparity is approximately equal to half a pixel (for example, the resolution enhancement value is approximately 2). If the condition 924 is met, the light imaging system 110 performs 850 resolution enhancement on the already extracted views. If the condition 924 is not met, the light imagining system 110 continues with the rest of the process from FIG. 8. In that case, the resolution enhancement is performed 850 based on a second spatially multiplexed image captured using adjusted optical parameters.

Figure 10:
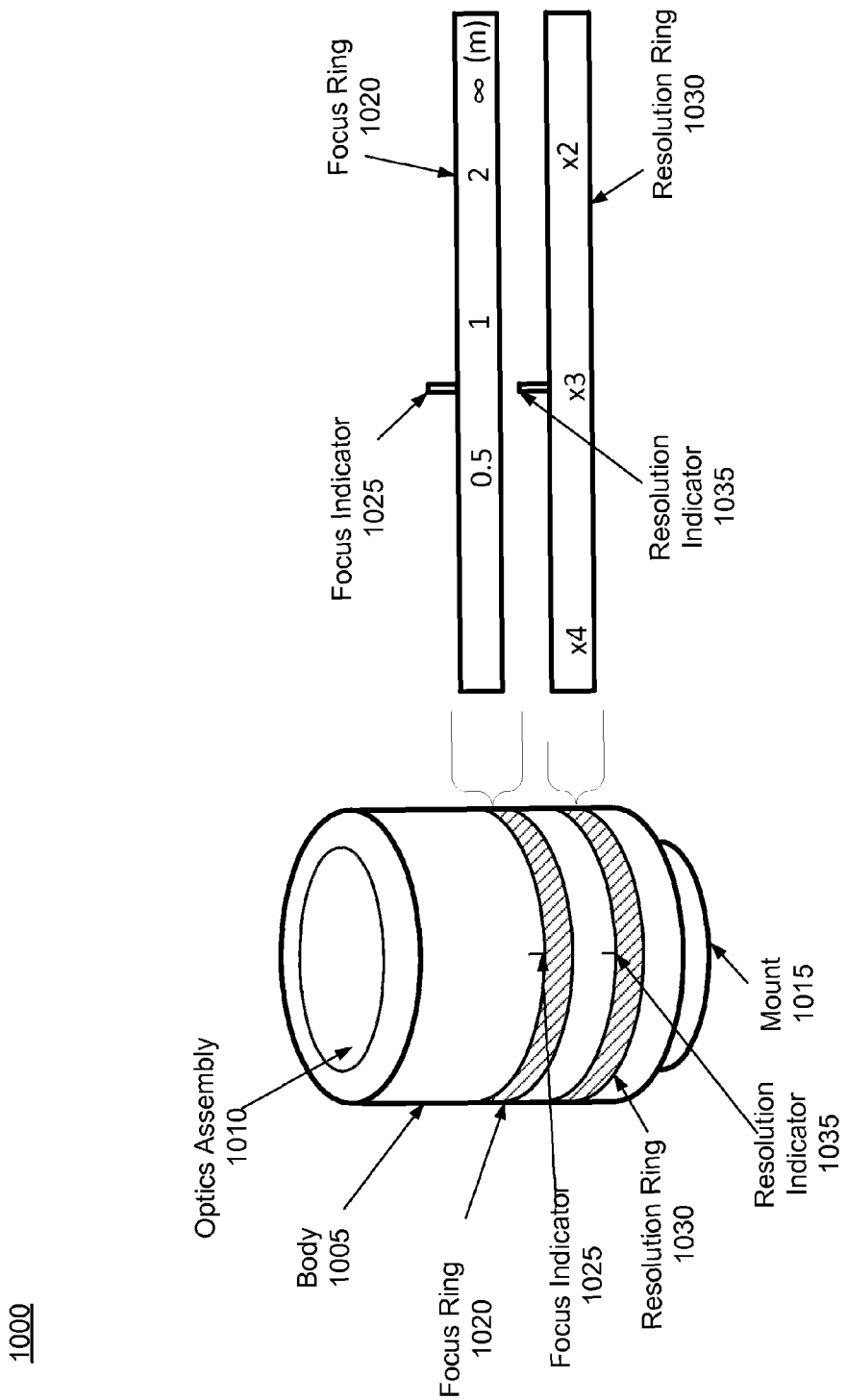
FIG. 10 is a diagram of an adjustable lens suitable for use in a light field imaging system, according to an embodiment.

Turning now to a discussion of an implementation of the light field imaging system 110, FIG. 10 is a diagram of an adjustable lens 1000 suitable for use in a light field imaging system, according to an embodiment. The lens 1000 includes a body 1005 which encloses an optics assembly 1010, and includes a mount 1015 that is used to couple the lens 1000 to the rest of the light field imaging system 110. The optics assembly 1010 is the primary imaging optics 112 discussed above with reference to FIG. 1A. The body 1005 also includes a focus ring 1020 and a resolution ring 1030.

The optics assembly 1010 may be adjusted by rotating the focus ring 1020 and/or resolution ring 1030. In this example, the focus ring 1020 is marked for object distances of 0.5 m, 1 m, 2 m, and infinity. In other embodiments, other distance values may be marked on the focus ring 1020. A focus indicator 1025 indicates the distance to the object (for example, $d_o$ in FIG. 7A) For example, the focus indicator 1025 indicates that the focus setting for the optics assembly 1010 is set for an object approximately 0.75 m away. In a conventional zoom lens or other adjustable lens, setting the object distance typically will determine the effective focal length and conjugate for the lens. However, in this case, the resolution enhancement factor will also affect these quantities.

The resolution ring 1030 is used to set a resolution enhancement value for the light field imaging system 110. In this example, the resolution ring 1030 is marked for resolution enhancement values of ×2, ×3, and ×4. In other embodiments, other resolution enhancement values may be marked on the resolution ring 1030. A resolution indicator 1035 indicates a selected resolution enhancement. For example, in FIG. 10, the resolution ring 1030 is set to a ×3 resolution enhancement value. Note that a setting of 0.75 m object distance and ×2 resolution enhancement is a different optical setting than a setting of 0.75 m object distance and ×3 resolution enhancement.

While not shown, in some embodiments, the lens 1000 may also include an aperture ring to control a size of an aperture within the optics lens assembly 1010. The aperture ring would present a plurality of different f-stops (for example, 2, 2.8, 4, 5.6, 8, 11, 16, 22, etc.) and an indicator identifying a selected f-stop. In some embodiments, the light imaging system 110 is configured to automatically select an f-stop for, for example, correct exposure, maximum sensor utilization, a specific depth of field, or some combination thereof.

Figure 11:
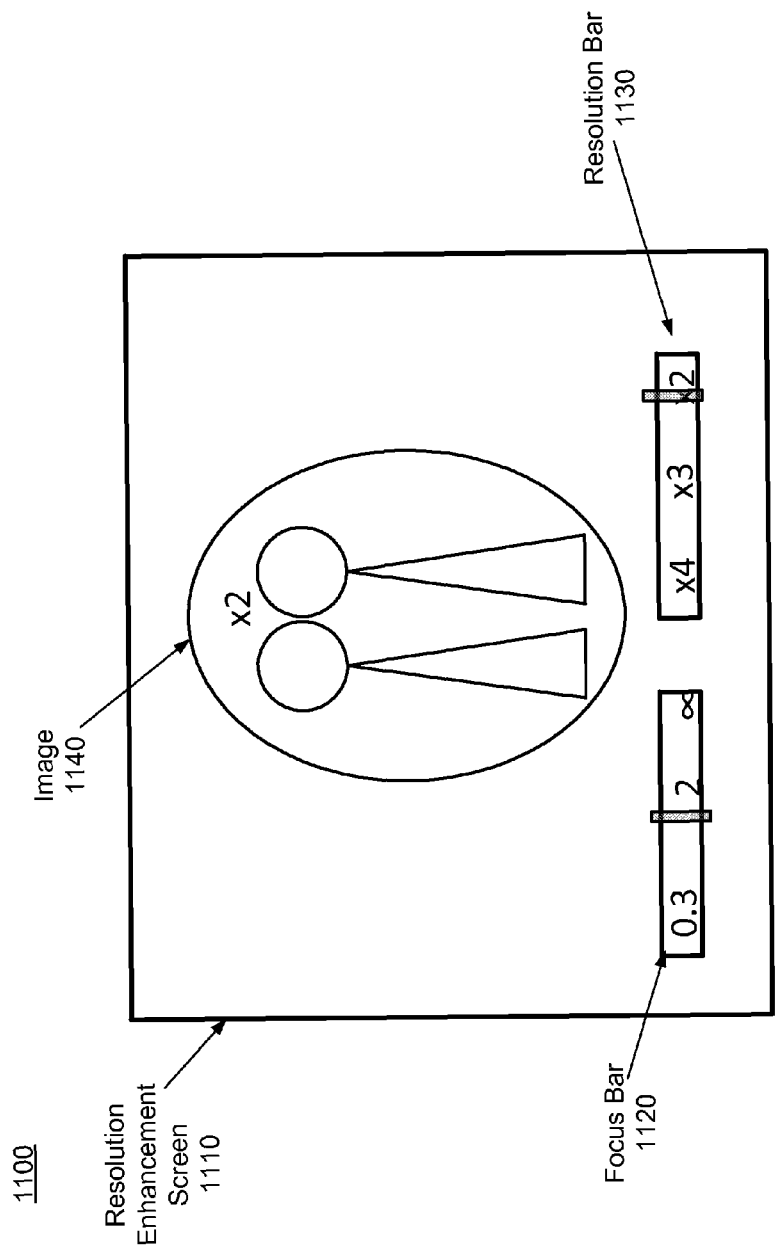
FIG. 11 is an electronic display of a light field imaging system, according to an embodiment.

FIG. 11 is an electronic display 1100 of a light field imaging system 110, according to an embodiment. The electronic display 1100 presents a resolution enhancement screen 1110. The resolution enhancement screen 1110 includes a focus bar 1120, a resolution bar 1130, and an image 1140. The focus bar 1120 and the resolution bar 1130 are adjustable such that a user may modify settings for one or both bars. The light field imaging system 110 modifies the image 1140 based on the settings of the focus bar 1120 and the resolution bar 1130. In FIG. 11, the resolution bar 1130 is set to ×2 resolution enhancement and the image 140 is displayed at ×2 resolution enhancement. In some embodiments, where an image of a higher resolution enhancement (for example, ×3) is displayed, that image would be displayed larger than the ×2 image 1140. Likewise, an image of a lower resolution enhancement (for example, ×1) would be displayed as an image smaller than the image 1140. In some embodiments, multiple versions of the image 1140 may be displayed concurrently at different resolutions.

Additionally, in some embodiments the light field imaging system 110 adjusts the settings of the focus bar 1120 based on a user adjustment to the resolution bar 1130, or vice versa. The light field imaging system 110 may also block certain settings of the focus bar 1120 based on the current setting of the resolution bar 1130, or vice versa. For example, for a particular setting of the focus bar 1120 the light field imaging system 110 may not allow ×4 resolution enhancement.

The systems and methods disclosed herein have a number of advantages. One advantage is to provide resolution enhancement by adding one or more features to light field imaging systems, such as calculating disparity and adjusting a resolution enhancement value, which are used along with light field imaging systems' ability to adjust focus to provide resolution enhancement. Moreover, disparity is determined using the equations included above that provide a granularity of sub-pixels across multiple views. Another advantage is that by adding a physical resolution ring to a light field imaging system to adjust resolution enhancement value is ease of use because it functions similarly to a focus ring, with which users are familiar. Similarly, an advantage of adding an interactive resolution ring along with an interactive focus ring in a light field imaging system display is for ease of use.

Additional Configuration Information

Although the detailed description contains many specifics, these should not be construed as limiting the scope of the disclosure but merely as illustrating different examples and aspects of embodiments of the disclosure. It should be appreciated that the scope of the disclosure includes other embodiments not discussed in detail above. Various other modifications, changes and variations which will be apparent to those skilled in the art may be made in the arrangement, operation and details of the method and apparatus of the present embodiments disclosed herein without departing from the spirit and scope of the embodiments as defined in the appended claims. Therefore, the scope of the claimed embodiments should be determined by the appended claims and their legal equivalents.

In alternate embodiments, aspects of the disclosure are implemented in computer hardware, firmware, software, and/or combinations thereof. Embodiments of apparatus of the disclosure can be implemented in a non-transitory computer readable storage medium and/or a computer program product tangibly embodied in a machine-readable storage device for execution by a programmable processor; and method steps of embodiments of the disclosure can be performed by a programmable processor executing a program of instructions to perform functions of embodiments of the disclosure by operating on input data and generating output. Embodiments of the disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules. Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components.

What is claimed is:

1. A light field imaging system for producing an image of an object, the light field imaging system comprising:
   a primary optical subsystem that forms an optical image of an object, the optical image located at an image plane of the primary optical subsystem;
   a light field sensor module comprising a secondary imaging array and a sensor array, the secondary imaging array imaging a pupil of the primary optical subsystem onto the sensor array, the secondary imaging array displaced from the image plane so that the sensor array is configured to capture an array of multiplexed views of the object;
   a processing module configured to determine one or more optical parameters to achieve a desired resolution enhancement value, wherein the primary optical subsystem and/or light field sensor module are adjustable according to the one or more optical parameters; and
   an auto defocus module to automatically adjust the primary optical subsystem and/or light field sensor module according to the one or more optical parameters determined by the processing module; and
   wherein the processing module is further configured to combine the captured array of multiplexed views into a digital image of the object having a resolution higher than a resolution of any of the multiplexed views, and wherein the array of multiplexed views were captured after automatic adjustment by the auto defocus module.

2. The light field imaging system of claim 1, wherein the one or more optical parameters include an effective focal length f of the primary optical subsystem, and the primary optical subsystem is adjustable in effective focal length.

3. The light field imaging system of claim 1, wherein the one or more optical parameters include a distance $d_i$ from the primary optical subsystem to the secondary imaging array, and the light field imaging system is adjustable in distance $d_i$.

4. The light field imaging system of claim 1, wherein the desired resolution enhancement value is an integer value greater than 1.

5. The light field imaging system of claim 1, wherein the processing module is further configured to:
   determine a region of interest within the captured array of multiplexed views;
   calculate an initial disparity for the region of interest;

determine a depth range of the region of interest using the initial disparity; and determine the desired resolution enhancement value subject to the determined depth range.

6. The light field imaging system of claim 1, wherein the processing module is further configured to determine the one or more optical parameters consistent with $$\text{Disparity}_{\text{in units of pixels}} = \alpha * \frac{w_p}{\varphi * f_\mu} * \frac{(d_o - d_f) * (d_i - f)}{(d_o - f)}$$

wherein f is an effective focal length of the primary optical subsystem, $d_o$ is a distance from the primary optical subsystem to an object plane, $d_f$ is a distance from the primary optical subsystem to an object plane when disparity is zero, $f_\mu$, is a focal length of the secondary imaging array, $\alpha$ is a factor that is added to account for image processing, $w_p$ is a size of a sensor in the sensor array, and $\varphi$ is distance between neighboring pixels in a view.

7. The light field imaging system of claim 1, wherein the auto defocus module receives feedback from the processing module and uses the feedback to adjust the one or more optical parameters to achieve the desired resolution enhancement value.

8. The light field imaging system of claim 1, wherein the primary optical subsystem includes an adjustable lens with a resolution ring, wherein the resolution ring is rotatable to adjust the lens and indicates to a user the desired resolution enhancement value of the light field imaging system.

9. The light field imaging system of claim 8, wherein the adjustable lens also includes a focus ring that is rotatable to adjust the lens and indicates to a user an effective focal length of the primary optical subsystem.

10. The light field imaging system of claim 8, wherein the adjustable lens also includes a focus ring that is rotatable to adjust the lens and indicates to a user a focus conjugate of the primary optical subsystem.

11. The light field imaging system of claim 1, further comprising an electronic display configured to:
present a resolution indicator to a user of the light field imaging system, wherein the resolution indicator indicates to a user the desired resolution enhancement value of the light field imaging system.

12. A method for producing an image of an object using a light field imaging system, the light field imaging system comprising a primary optical subsystem and a light field sensor module having a secondary imaging array and a sensor array, the method comprising:
receiving a desired resolution enhancement value;
determining one or more optical parameters to achieve the desired resolution enhancement value, wherein the primary optical subsystem and/or light field sensor module are adjustable according to the one or more optical parameters;
automatically adjusting the light field imaging system according to the one or more determined optical parameters;
capturing an array of multiplexed views of the object after automatic adjustment of the light field imaging system according to the one or more determined optical parameters; wherein the primary optical subsystem forms an optical image of the object, the optical image located at an image plane of the primary optical subsystem; and
the secondary imaging array images a pupil of the primary optical subsystem onto the sensor array, the secondary imaging array displaced from the image plane so that the sensor array is configured to capture the array of multiplexed views of the object; and
combining the captured array of multiplexed views into a digital image of the object having a resolution higher than a resolution of any of the multiplexed views.

13. A non-transitory computer-readable storage medium storing executable computer program instructions for producing an image of an object using a light field imaging system, the light field imaging system comprising a primary optical subsystem and a light field sensor module having a secondary imaging array and a sensor array, the instructions executable by a processor and causing the light field imaging system to perform a method comprising:
receiving a desired resolution enhancement value;
determining one or more optical parameters to achieve the desired resolution enhancement value, wherein the primary optical subsystem and/or light field sensor module are adjustable according to the one or more optical parameters;
automatically adjusting the light field imaging system according to the one or more determined optical parameters;
capturing an array of multiplexed views of the object after automatic adjustment of the light field imaging system according to the one or more determined optical parameters; wherein the primary optical subsystem forms an optical image of the object, the optical image located at an image plane of the primary optical subsystem; and
the secondary imaging array images a pupil of the primary optical subsystem onto the sensor array, the secondary imaging array displaced from the image plane so that the sensor array is configured to capture the array of multiplexed views of the object; and
combining the captured array of multiplexed views into a digital image of the object having a resolution higher than a resolution of any of the multiplexed views.

14. The non-transitory computer-readable storage medium of claim 13 wherein the one or more optical parameters include an effective focal length f of the primary optical subsystem, and automatically adjusting the light field imaging system comprises automatically adjusting the effective focal length f of the primary optical subsystem.

15. The non-transitory computer-readable storage medium of claim 13 wherein the one or more optical parameters include a distance $d_i$ from the primary optical subsystem to the secondary imaging array, and automatically adjusting the light field imaging system comprises automatically adjusting the distance $d_i$.

16. The non-transitory computer-readable storage medium of claim 13 wherein the desired resolution enhancement value is an integer value greater than 1.

17. The non-transitory computer-readable storage medium of claim 13 wherein the method further comprises:
determining a region of interest within the captured array of multiplexed views;
calculating an initial disparity for the region of interest;
determining a depth range of the region of interest using the initial disparity; and
determining the desired resolution enhancement value subject to the determined depth range.

18. The non-transitory computer-readable storage medium of claim 13 wherein the one or more optical parameters are determined consistent with $$\text{Disparity}_{in\,units\,of\,pixels} = \alpha * \frac{w_p}{\varphi * f_u} * \frac{(d_o - d_f)*(d_i - f)}{(d_o - f)}$$

wherein f is an effective focal length of the primary optical subsystem,
$d_o$ is a distance from the primary optical subsystem to an object plane,
$d_f$ is a distance from the primary optical subsystem to an object plane when disparity is zero,
$f_\mu$, is a focal length of the secondary imaging array,
$\alpha$ is a factor that is added to account for image processing,
$w_p$ is a size of a sensor in the sensor array, and
$\phi$ is distance between neighboring pixels in a view.

19. The non-transitory computer-readable storage medium of claim 13 wherein the method further comprises:
presenting a resolution indicator to a user of the light field imaging system, wherein the resolution indicator indicates to the user the desired resolution enhancement value of the light field imaging system.

* * * * *